United States Patent [19]

Niemann

[11] Patent Number: 5,505,424
[45] Date of Patent: Apr. 9, 1996

[54] SWIVEL SUPPORT FOR AN ARTICLE

[75] Inventor: Gunther B. Niemann, Cincinnati, Ohio

[73] Assignee: Health Care Information Corp., Cincinnati, Ohio

[21] Appl. No.: 285,999

[22] Filed: Aug. 4, 1994

[51] Int. Cl.$^6$ .................................................. F16M 13/00
[52] U.S. Cl. ................................... 248/585; 248/288.31
[58] Field of Search ................................ 248/585, 580, 248/584, 586, 587, 589, 288.3, 288.5, 917, 919, 920, 921, 922, 923, 296, 371; 403/114, 115, 113

[56] References Cited

U.S. PATENT DOCUMENTS

| | | | |
|---|---|---|---|
| 823,000 | 6/1906 | Snowhill | 285/175 |
| 1,734,244 | 11/1929 | Bineman | 403/143 |
| 2,763,500 | 9/1956 | Turner | 403/141 |
| 4,266,747 | 5/1981 | Souder, Jr. et al. | 248/280.1 |
| 4,354,654 | 10/1982 | Werner et al. | 248/663 |
| 4,447,031 | 5/1984 | Souder, Jr. et al. | 248/280.1 |
| 4,570,892 | 2/1986 | Czech et al. | 248/372.1 |
| 4,706,920 | 11/1987 | Ojima et al. | 248/371 |
| 5,007,608 | 4/1991 | Carroll, Jr. | 248/297.2 |
| 5,102,081 | 4/1992 | Barchus | 248/181 |
| 5,169,116 | 12/1992 | Bergetz | 248/680 |
| 5,243,434 | 9/1993 | Nodama | 358/249 |
| 5,280,871 | 1/1994 | Chuang | 248/516 |

FOREIGN PATENT DOCUMENTS

WO/92/17313  10/1992  WIPO .

OTHER PUBLICATIONS

Engineers' Illustrated Thesaurus, By Herbert Herkimer; Chemical Publishing Co., Inc., New York, NY, Copyright 1952; pp. 204, 205, 260–263.

Primary Examiner—Ramon O. Ramirez

[57] ABSTRACT

A ball tilt joint permits a wired mounted unit, preferably a TV (monitor) to be rotated and tilted for viewing, without breaking wires. An axial hole through the ball stem allows electrical wires to be fed to the unit. The ball stem has limited rotation, due to stop screws. A ball socket carries the wired unit, and the socket can tilt about the ball center, but not rotate on the ball around the ball stem axis, because of a socket pin which extends into a slot machined into the ball. The pin is oriented radially towards the ball center, and everything is mounted to the end of an articulatable arm.

11 Claims, 4 Drawing Sheets

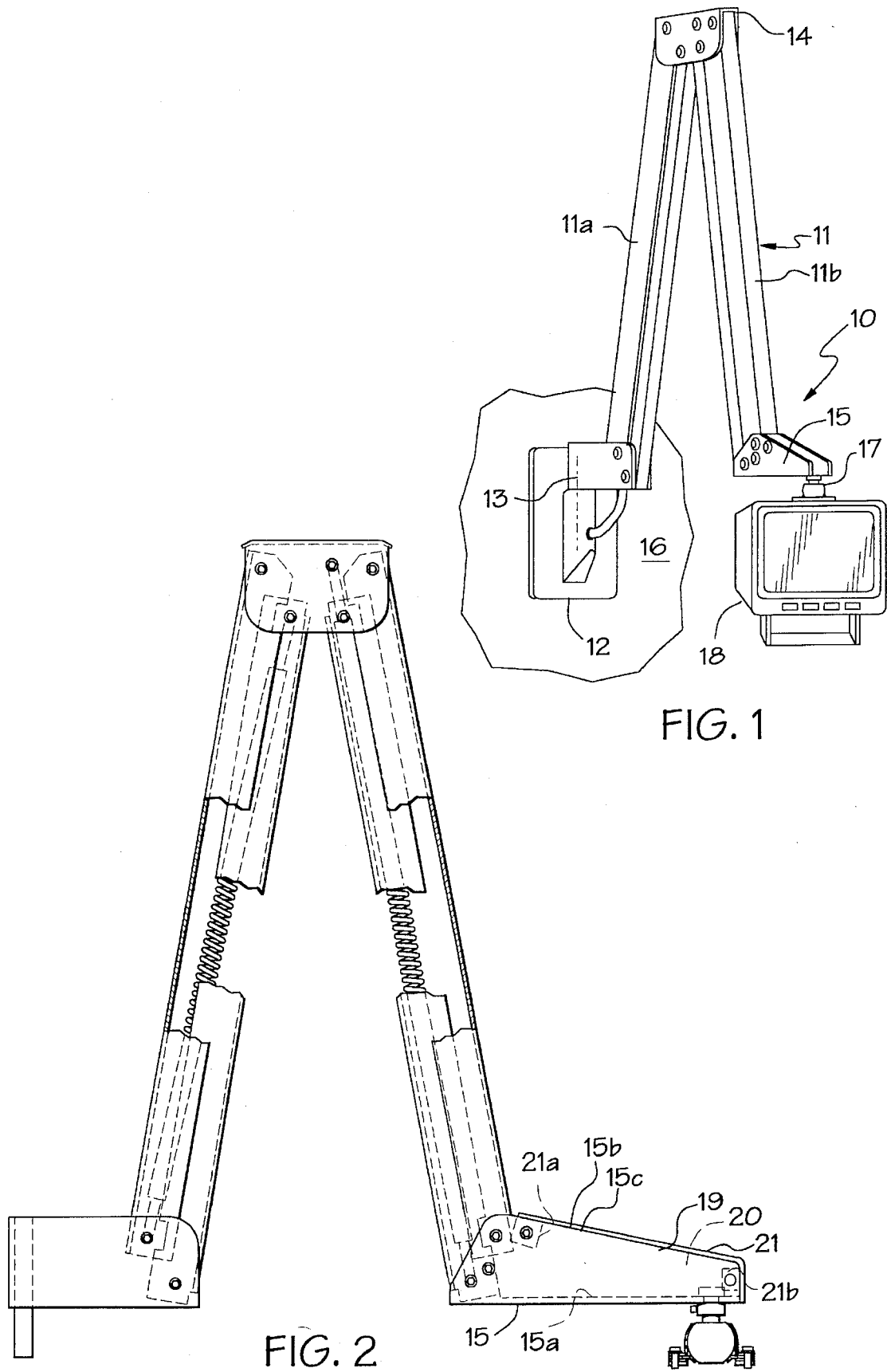

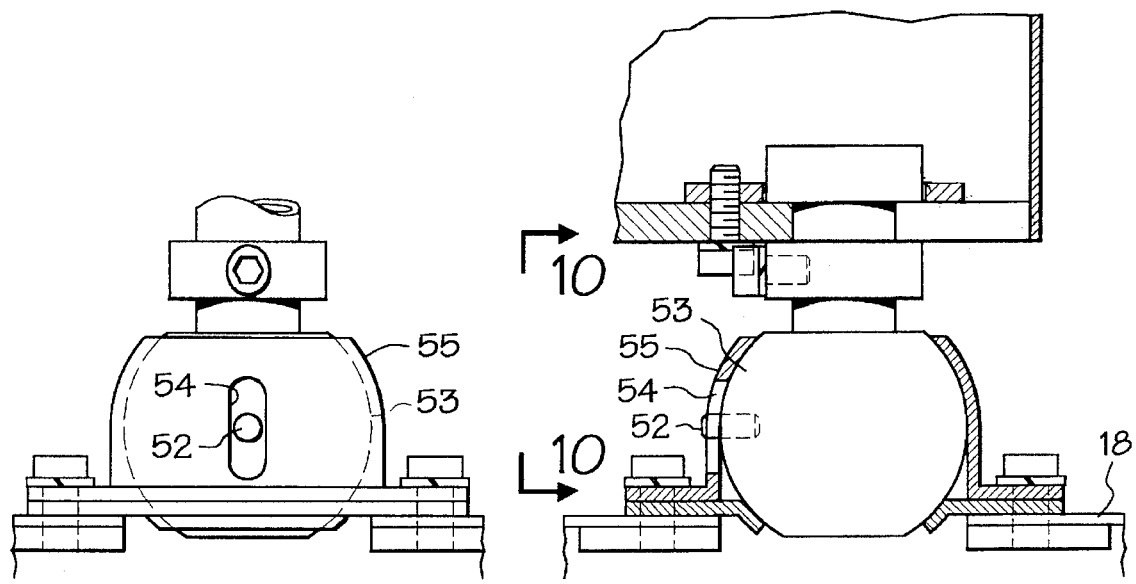
FIG. 10
FIG. 9
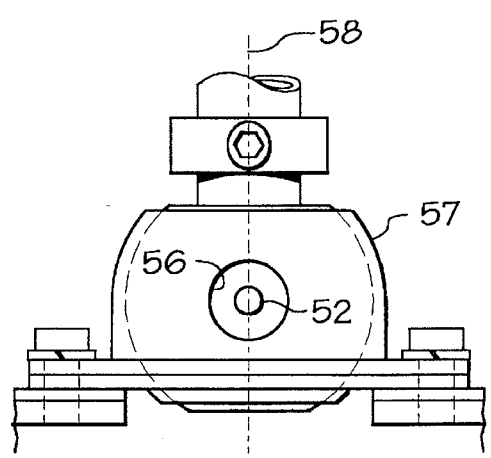
FIG. 11

SWIVEL SUPPORT FOR AN ARTICLE

FIELD OF INVENTION

This invention relates generally to setting an article to rotated and tilted positions with respect to a reference base, and particularly to setting the attitude of a television set, computer monitor, etc. with respect to a viewer, especially when the article is also supported by a wall-mounted, extendible linkage.

BACKGROUND OF THE INVENTION

It is well-known to support a television set on a wall bracket. In hospitals, for example, it is also known to provide an extendible linkage which has a fixed end mounted to the wall, and which has a movable end carrying a bracket. The linkage is comprised of parallel links, so the bracket is maintained in a constant attitude with respect to the wall as the bracket is moved about. The bracket, in turn, carries a television set, monitor, or other article, which may be pushed and pulled with respect to the wall by persons desiring a convenient setting; such setting may, of course, include simply moving the television out of the way when not in use. In order to provide great flexibility in setting, the article is connected to the bracket by at least a rotary joint which permits the article to be rotated about a vertical axis as the linkage is moved. Often a universal joint is also employed to permit omnidirectional tilting of the article with respect to the floor. It is known, for example, to provide a Hooke or Cardan joint, featuring crossed pins, to provide tilting motion about a vertical, rotary axis. The Hooke joint tends to be quite complex.

It is also known to provide a ball and socket joint, where a ball member is conveniently formed on a rotary member; the mating spherical socket is snuggly attached to the ball member and affixed to the supported article. Thus, the rotary member provides for rotation of the article about a vertical axis, with respect to a wall support linkage, and the ball and socket joint provides for omnidirectional tilt. In the support of an electrically powered article such as a television set, it is desirable to conceal electrical wires by feeding them from a wall source, through the central enclosure of the linkage, and, finally, down through a vertical hole in the rotary member and ball member, and into the television cabinet. This creates an aesthetic look to the wall-mounted arrangement. Rotation of the rotary member is limited to approximately 360 degrees, by stops. One difficulty which may be experienced in the use of the described ball and socket joint is that, although the rotary member strikes a stop, the socket may be forced to rotate still further about the ball member. If the television and socket are forced to rotate a full 360 degrees beyond the rotary member stop, and possibly further, the wires could twist and break.

The invention now to be described obviates the problem inherent in the prior ball and socket joints for supporting an article.

SUMMARY OF THE INVENTION

It is an object of the invention to provide an improved ball and socket joint for supporting an article such as a television set, computer monitor, etc.

Another object of the invention is to provide an improved ball and socket joint for supporting an electrical article, wherein electrical wires are fed through the joint, and wherein the wires are less likely to twist and break than in prior art assemblies.

The invention is shown embodied in a support for an article, comprising: a base; rotary means for relatively rotating the article with respect to the base; ball and socket means for relatively tilting the article with respect to the base; and, pin and slot means for controlling the ball and socket means.

BRIEF DESCRIPTION OF THE DRAWINGS

FIG. 1 is a perspective view of a television set supported by a wall-mounted linkage.

FIG. 2 is an enlarged side elevational view of the linkage of FIG. 1.

FIG. 9 is an elevational view of an alternative embodiment of the invention.

FIG. 10 is an elevational view, taken along the line 10—10, of FIG. 9.

FIG. 11 is an elevational view of an alternative embodiment of the invention.

DESCRIPTION OF THE INVENTION

Figure 4:
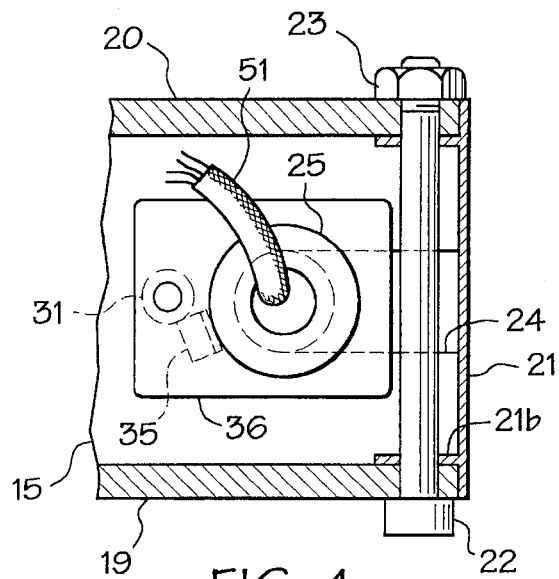
FIG. 4 is a plan section, taken along the line of 4—4, of FIG. 3.

At the outset, it should be noted that certain attitudinal references, such as "vertical", "horizontal", etc., are made by way of example, and not limitation, to establish a frame of reference for the reader; various other frames of reference may be employed without departing from the scope of the invention.

FIG. 1 of the drawings illustrates a support assembly 10, wherein a parallel linkage 11 is pivotally affixed to a wall bracket 12 having a vertical pivot axis 13. See, for example, U.S. Pat. No. 4,447,031, the disclosure of which is incorporated herein by reference. The linkage 11 has front and rear arms 11a,b joined at an elbow 14 so that an end bracket 15 on the free end of the linkage 11 may be moved toward and away from the wall bracket 12, and the end bracket 15 will remain in a constant attitude with respect to the wall 16. The end bracket 15 carries a ball and socket joint 17 which, in turn, supports a television set 18 or other article.

Figure 3:
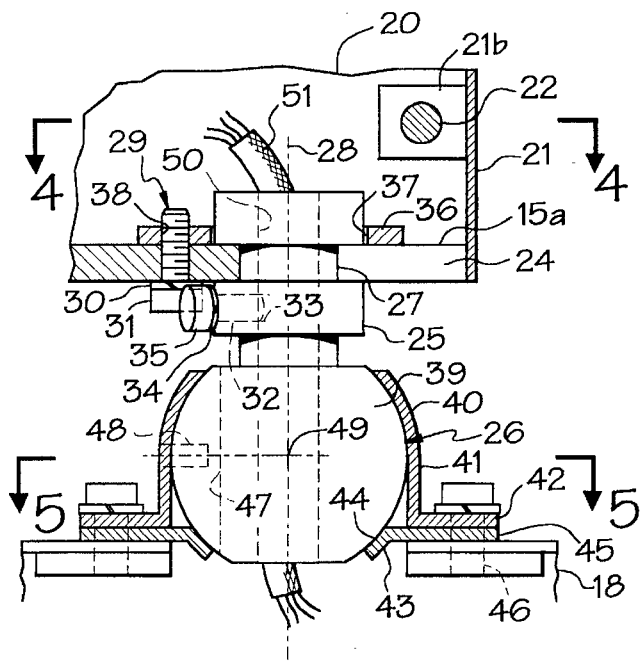
FIG. 3 is an elevational through the joint for rotating and tilting the television article of FIG. 1.

FIG. 2 shows the end bracket 15, an upwardly-opening U-channel, having a flat bottom 15a, parallel to the floor (not shown). The top edges 15b,c of the channel walls 19,20 are slightly angled to the bottom 15a, and receive a sheet metal cover 21, which has tabs 21a,b extending within the bracket 15. To secure the cover 21 to the end bracket 15, horizontal screws 22 pass through both channel walls 19,20 and the tabs 21a,b, and receive lock nuts 23 (FIG. 4). With reference to FIGS. 3 and 4, the bottom 15a of the end bracket 15 has an open-ended slot 24 which receives the stem 25 of a ball member 26. The stem 25 is cylindrical, and has a circular groove 27 which is sized to fit the slot 24. Thus, the stem 25 is constrained against vertical movement and may only rotate around a vertical axis 28 with respect to the end bracket 15. In order to limit rotation of the stem 25 to approximately 360 degrees, a vertical screw 29 is threaded through the bottom 15a of the end bracket 15, near the stem 25, and secured with a lock washer 30. The head of the screw 29 functions as a stop 31. The stem 25 has a horizontal screw 32, threadably received in a radially-extending hole 33, and tightened against a lock washer 34, such that the horizontal screw head 35 will strike the stop 31. A thin plate 36, having a central clearance hole 37 and a radially-displaced clearance hole 38, is simply placed over the stem 25 and vertical screw 29 after sliding the stem 25 into the slot 24; the vertical screw 29 retains the stem 25 with the end bracket 15. In some installations, a nut (not shown) may be used with the screw 29.

As seen in FIG. 1, the television set 18 depends from the end bracket 15 by means of the downwardly-extending stem 25. It will be appreciated, however, that the stem 25 may be inverted, to support a television set 18 or other article from underneath.

Figure 5:
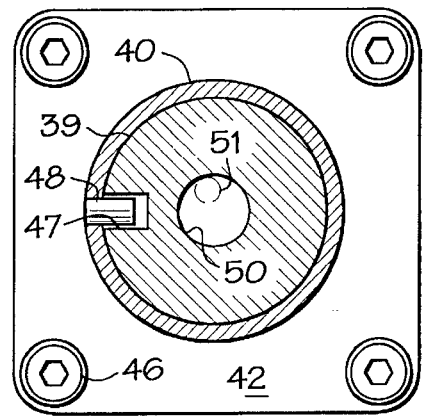
FIG. 5 is a plan section, taken along the line 5—5 of FIG. 4.
Figure 6:
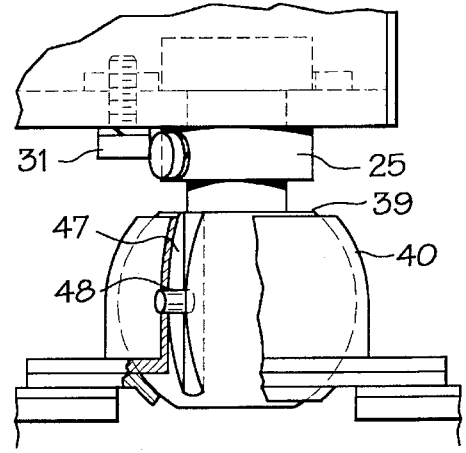
FIG. 6 is an elevational view, in partial section, of the elements of FIG. 3, partially rotated about the vertical axis.

FIG. 3 shows the ball member stem 25, i.e. the rotary means, as having an integral ball 39 at its bottom end. The ball 39 has a mating socket 40 extending around its upper portion, and the socket 40 has an integral skirt 41 and flange 42. A bottom socket plate 43 is formed with a spherical portion 44 and an integral flange 45, such that when the two flanges 42,45 are clamped together, a slight interference fit causes a predetermined amount of frictional drag between the socket 40 and ball 39; the drag maintains set, tilted positions of the television set 18. Screws 46 passing through the flanges 42,45 and into the television set 18 complete the assembly. In order to limit relative rotation between the ball 39 and socket 40, about the vertical axis 28, the ball 39 has a vertical slot 47, and the socket 40 has a cylindrical pin 48 which extends into the slot 47, towards the ball center 49. With reference also to FIGS. 5 and 6, the pin 48 is welded to the socket 40, but other types of pin means may serve the same purpose; for instance, a dog-point set screw could be used. The slot 47 is machined to provide ample clearance at the pin 48, since this device can tolerate some limited relative rotary motion between the stem 25 and ball socket 40. A vertical hole 50, drilled through the ball 39 and stem 25, serves as a duct or conduit for feeding electrical wires 51 from the wall-supported linkage 11 into the television set 18, and the limited rotary movement between the stem 25 and television set 18 prevents twisting of the wires 51 to a breaking point.

Figure 8:
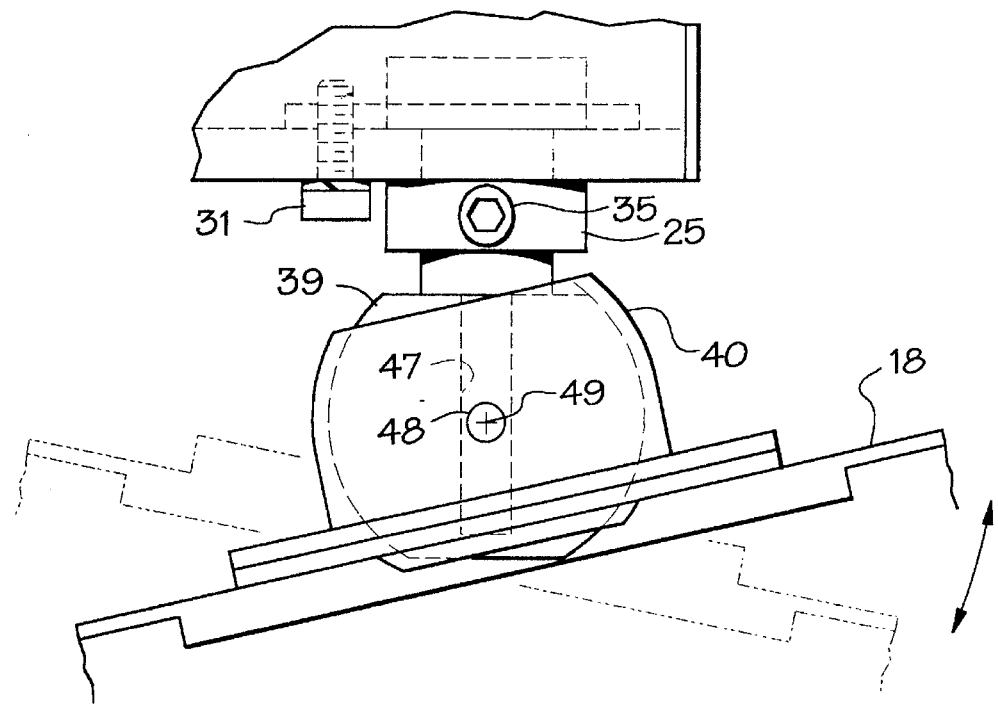
FIGS. 7 and 8 are elevational views showing range of tilting movement.
Figure 7:
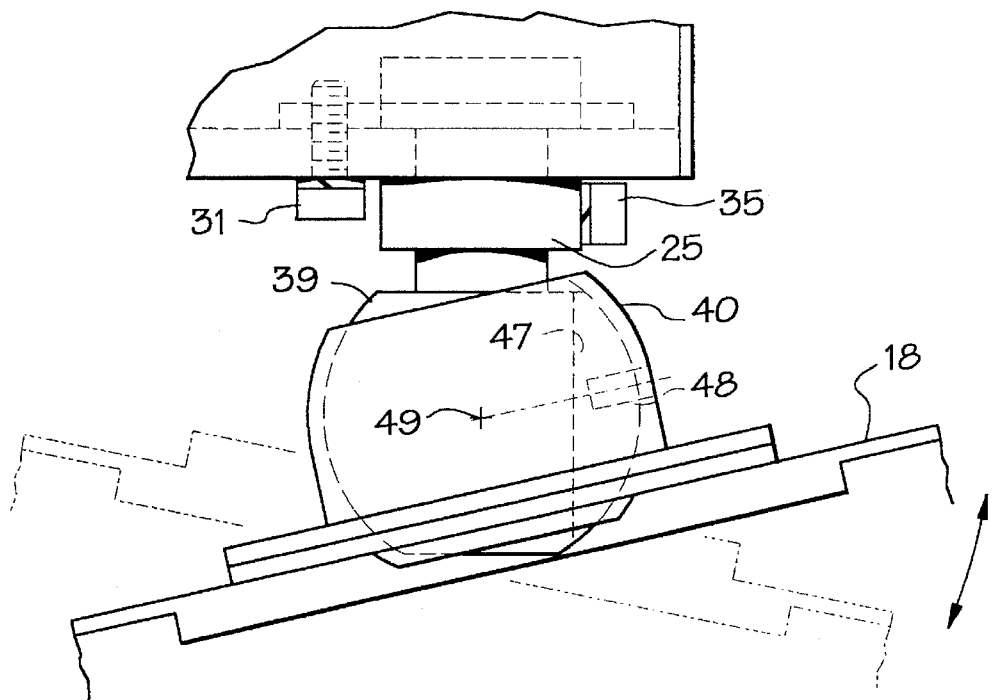

FIGS. 7 and 8 show the range of motion. The solid and phantom lines of FIG. 7 show that the socket 40 and television set 18 may be tilted about the ball center 49 as the pin 48 moves along the slot 47, while the solid and phantom lines of FIG. 8 show that the socket 40 and television set 18 may be tilted about the pin 48 and ball center 49; combining motions of FIGS. 7 and 8 produces infinite omnidirectional tilt positions about the ball center 49.

FIGS. 9 and 10 show an alternative embodiment, an inversion of the pin and slot means, wherein the pin 52 is affixed into the ball 53, and the slot 54 is formed into the socket 55.

FIG. 11 is an alternative embodiment which shows the slot of FIG. 10 replaced with a hole 56. In such a configuration there will be some limited relative rotation of the socket 57 with respect to the stem axis 58; this small, controlled movement may still work satisfactorily in some ball and socket support assemblies to prevent wire breakage, since continuous undirectional rotation is not possible. Tilting movement in a vertical plane is very restricted, however, and a slot is therefore the preferred opening for the pin.

The invention is not limited to the embodiments shown, and extends to all embodiments coming with the scope of the following claims.

What is claimed is:

1. A swivel support for an electrical article, comprising:

a base;

a ball member rotatably fixed to said base, said ball member having a ball with a ball centerpoint, a stem, and a slot across said ball;

a socket seated on, and supported by said ball, said socket having a pin member affixed thereto and extending into said slot; and, attachment means for attaching said electrical article to said socket, whereby said ball member, socket and electrical article may be rotated together with respect to said base, and whereby said socket and electrical article may tilt about said ball centerpoint with respect to said ball member.

2. The swivel support of claim 1, further comprising:

means for maintaining tilted positions of said electrical article with respect to said base.

3. The swivel support of claim 2, wherein said electrical article is a television set.

4. The swivel support of claim 1, further comprising:

stop means for limiting rotation of said ball member with respect to said base.

5. The swivel support of claim 4, further comprising:

means for maintaining tilted positions of said electrical article with respect to said base.

6. The swivel support of claim 1, further comprising:

means for ducting an electrical wire through said ball member.

7. The swivel support of claim 4, further comprising:

means for ducting an electrical wire through said ball member.

8. The swivel support of claim 7, wherein said electrical article is a television set.

9. A support for an article, comprising:

a base;

rotary means for relatively rotating said article with respect to said base;

ball and socket means for relatively tilting said article with respect to said base;

pin means for controlling said ball and socket means;

stop means for limiting said rotary means; and aperture means for ducting an electrical wire through said ball and socket means.

10. The support of claim 9, further comprising:

means for maintaining tilted positions of said article with respect to said base.

11. A support for an electrical article, comprising:

a base;

rotary means for relatively rotating said electrical article with respect to said base about an axis of rotation;

ball and socket means for relatively tilting said article with respect to said base about a ball centerpoint, transverse to said axis of rotation, said ball and socket means including a ball and socket;

pin means for substantially preventing relative rotation between said ball and socket about said axis of rotation;

stop means for limiting relative rotation between said electrical article and said base, about said axis of rotation; and means for ducting an electrical wire from said base to said electrical article.

* * * * *